(12) United States Patent
Kim (10) Patent No.: US 11,489,393 B2
(45) Date of Patent: Nov. 1, 2022

(54) STATOR ASSEMBLY OF HAIRPIN WINDING MOTOR

(71) Applicant: HYUNDAI MOBIS Co., Ltd., Seoul (KR)

(72) Inventor: Yong Ho Kim, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 342 days.

(21) Appl. No.: 16/726,903

(22) Filed: Dec. 25, 2019

(65) Prior Publication Data
US 2020/0220411 A1    Jul. 9, 2020

(30) Foreign Application Priority Data

Jan. 4, 2019    (KR) .......................... 10-2019-0001253

(51) Int. Cl.
| | |
|---|---|
| *H02K 3/48* | (2006.01) |
| *H02K 1/16* | (2006.01) |
| *H02K 3/12* | (2006.01) |
| *H02K 15/04* | (2006.01) |
| *H02K 3/28* | (2006.01) |

(52) U.S. Cl.
CPC .............. *H02K 3/48* (2013.01); *H02K 1/165* (2013.01); *H02K 3/12* (2013.01); *H02K 15/0421* (2013.01); *H02K 3/28* (2013.01)

(58) Field of Classification Search
CPC ............ H02K 1/165; H02K 3/12; H02K 3/28; H02K 3/48; H02K 15/0421
See application file for complete search history.

(56) References Cited

U.S. PATENT DOCUMENTS

| | | |
|---|---|---|
| 7,268,455 B2 | 9/2007 | Kouda et al. |
| 9,847,683 B2 | 12/2017 | Jung |
| 2003/0015932 A1 | 1/2003 | Oohashi et al. |

FOREIGN PATENT DOCUMENTS

| | | | |
|---|---|---|---|
| CN | 107482815 A | * | 12/2017 |
| CN | 107492959 A | * | 12/2017 |
| CN | 207265748 U | * | 4/2018 |
| CN | 207265764 U | * | 4/2018 |
| GB | 263833 | * | 9/1927 |
| JP | 2003-032933 | | 1/2003 |

(Continued)

OTHER PUBLICATIONS

Office Action dated Jan. 7, 2022, issued to Korean Patent Application No. 10-2020-0094367.

*Primary Examiner* — Carl J Arbes
(74) *Attorney, Agent, or Firm* — H.C. Park & Associates, PLC (57) ABSTRACT

A stator assembly of a hairpin winding motor capable of improving the performance of the winding motor and the insulation performance of a hairpin coil, and includes a stator core through which a plurality of slots pass in a circumferential direction; and a plurality of hairpin coils respectively fastened to and interconnected with the slots to form a coil winding. The hairpin coil includes a head portion bent in a U shape and exposed to the outside of the stator core, and a pair of leg portions configured to extend in parallel from both ends of the head portion to be inserted into a specific slot and the slot spaced apart from the specific slot by one pole pitch and of which end portions are exposed to the outside of the stator core.

19 Claims, 6 Drawing Sheets

(56) References Cited

FOREIGN PATENT DOCUMENTS

| KR | 10-2013-0013105 | | 2/2013 |
|----|----|----|----|
| KR | 10-1284715 | | 7/2013 |
| KR | 10-1365469 | | 2/2014 |
| WO | 2002013353 | A2 * | 2/2002 |
| WO | 2014/024987 | A1 * | 2/2014 |
| WO | 2018092022 | A1 * | 5/2018 |
| WO | 2018145807 | A1 * | 8/2018 |

* cited by examiner

STATOR ASSEMBLY OF HAIRPIN WINDING MOTOR

CROSS-REFERENCE TO RELATED APPLICATION

This application claims priority from and the benefit of Korean Patent Application No. 10-2019-0001253, filed on Jan. 4, 2019, which is hereby incorporated by reference for all purposes as if it set forth herein.

BACKGROUND

Field

Exemplary embodiments relate to a stator assembly of a hairpin winding motor, and more particularly, to a stator assembly of a hairpin winding motor capable of improving the performance of the winding motor and the insulation performance of a hairpin coil.

Discussion of the Background

Research and development, and commercialization of eco-friendly automobile-related parts have actively proceeded in the automobile industry according to international demands for greenhouse gas reduction regulation and improvement of fuel efficiency of automobiles.

A technology for exerting a driving force using an electric motor is in development as a kind of an eco-friendly automobile-related part, and especially for this, a motor-producing technology emphasizing improved motor operating efficiency is also required.

Carmakers and manufacturers of eco-friendly parts apply hairpin coils to driving motors as a part of technology development to reduce the weight and volume of each of the eco-friendly parts.

Due to development of a technology for reducing the weight and volume of each of the eco-friendly parts, the weight of a vehicle or an eco-friendly vehicle can be reduced, and an inner space can be secured.

According to a method of manufacturing a drive motor to which a hairpin coil is applied according to the related art, unlike a general motor in which a coil is wound, the hairpin coil is molded or formed in a U-shaped shape so that a coil or ring having a generally angular cross-section can be inserted into a slot of the stator core in advance, thereby making the hairpin coil.

Accordingly, since a conventional hairpin coil has a lower production yield than a circular coil, and a film may be damaged or reduced in thickness in the process of forming a coil with high load while twisting and bending a coil having an angular cross-sectional area to wind the hairpin coil, insulation performance can be degraded.

Meanwhile, the stator core is formed of a magnetic material, and includes a yoke forming a magnetic path and a tooth protruding radially inward from the yoke.

A plurality of teeth are formed along a circumferential direction.

A slot is formed between the teeth, and substantially, the hair pin coil is inserted into the slot to form a stator coil.

When the hairpin coil according to the related art is designed to insert an angular coil having the same thickness and width into a stator slot, since the teeth become thick in a direction toward the yoke forming the magnetic path in the stator core, and the teeth become thin in a direction opposite the direction toward the yoke, design constraints of a stator assembly are incurred.

Accordingly, when a motor is operated under a load condition, the direction toward the yoke in which the teeth are thick has a low magnetic flux density, but the direction opposite the direction toward the yoke in which the teeth are thin easily saturates and thus, performance is degraded.

Further, since the film is thinned or damaged during the process of forming the coil with high load while twisting and bending a coil having a rectangular cross-sectional area to wind the hairpin, insulation performance is degraded.

The above information disclosed in this Background section is only for enhancement of understanding of the background of the invention and, therefore, it may contain information that does not constitute prior art.

SUMMARY

Exemplary embodiments of the present invention provide a stator assembly of a hairpin winding motor capable of improving the performance of the winding motor and the insulation performance of a hairpin coil.

Additional features of the invention will be set forth in the description which follows, and in part will be apparent from the description, or may be learned by practice of the invention.

An exemplary embodiment of the present invention provides a stator assembly of a hairpin winding motor including: a stator core through which a plurality of slots are formed to pass therethrough in a circumferential direction; and a plurality of hairpin coils respectively fastened to, and interconnected with, the slots to form a coil winding. Each of the hairpin coils includes a head portion bent in a U shape and exposed to the outside of the stator core, and a pair of leg portions configured to extend in parallel from both ends of the head portion to be inserted into a specific slot and the slot spaced apart from the specific slot by one pole pitch and of which end portions are exposed to the outside of the stator core.

The stator core may include a yoke formed of a magnetic material and forming a magnetic path, and a plurality of teeth inwardly protruding radially inward from an inner circumferential surface of the yoke along a circumferential direction to form the slot, the slot may be formed to have a trapezoidal shape, in which the outside is broad and the inside is narrow, and a cross-sectional shape of each of the teeth may be formed to have a rectangular shape.

The two leg portions of the hairpin coil disposed adjacent to each other in a circumferential direction may be welded to each other.

A cross-section of the head portion may be formed in a circular shape, and a cross-section of each of the pair of leg portions may be formed to have a trapezoidal shape, in which the outside is broad and the inside is narrow.

A cross-sectional area of the head portion may be roughly 2 to 20% greater than cross-sectional areas of the leg portions.

The leg portions may be formed through a rolling process.

The hairpin coils may be formed of a first coil inserted into the slot toward the yoke, a second coil inserted into the slot opposite the yoke with respect to the first coil, a third coil inserted into the slot opposite the yoke with respect to the second coil, and a fourth coil inserted into the slot opposite the yoke with respect to the third coil.

Cross-sectional areas of the leg portion of the first coil, the leg portion of the second coil, the leg portion of the third coil, and the leg portion of the fourth coil may be the same.

Another exemplary embodiment of the present invention provides a stator assembly of a hairpin winding motor including: a stator core in which a plurality of slots are formed to pass therethrough in a circumferential direction; and a plurality of hairpin coils respectively fastened to and interconnected with the slots to form a coil winding. Each of the hairpin coils includes a head portion exposed to the outside of the stator core at one end thereof, and a leg portion configured to extend from the other end of the head portion to be inserted into the slot and of which an end portion is exposed to the outside of the stator core.

The two head portions repeatedly inserted into a specific slot and the slot spaced apart from the specific slot by one pole pitch along a circumferential direction, and disposed adjacent to each other in a circumferential direction may be welded to each other, and the two leg portions disposed adjacent to each other in a circumferential direction may be welded to each other, in the plurality of the hairpin coils.

A cross-section of the head portion may be formed in a circular shape, and a cross-section of the leg portion may be formed to have a trapezoidal shape, in which the outside is broad and the inside is narrow.

A cross-sectional area of the head portion may be roughly 2 to 20% greater than a cross-sectional area of the leg portion.

Each of the cross-section of the head portion and the cross-section of the leg portion may be formed to have a trapezoidal shape, in which the outside is broad and the inside is narrow.

Cross-sectional areas of the head portion and the leg portions may be the same.

The head portion and the leg portion may be formed through a rolling process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

The embodiments are only provided to completely disclose the present disclosure and completely convey the scope of the present disclosure to those skilled in the art, and the present disclosure is defined by the disclosed claims. Meanwhile, terms used in the description are provided not to limit the present disclosure but to describe the embodiments. In the embodiment, the singular form is intended to also include the plural form unless the context clearly indicates otherwise. The terms "comprise" and/or "comprising" as used herein do not preclude the presence or addition of at least one other component, step, operation, and/or element other than the stated components, steps, operations and/or elements.

Hereinafter, a first exemplary embodiment of the present disclosure will be described in detail with reference to the accompanying drawings.

Figure 1:
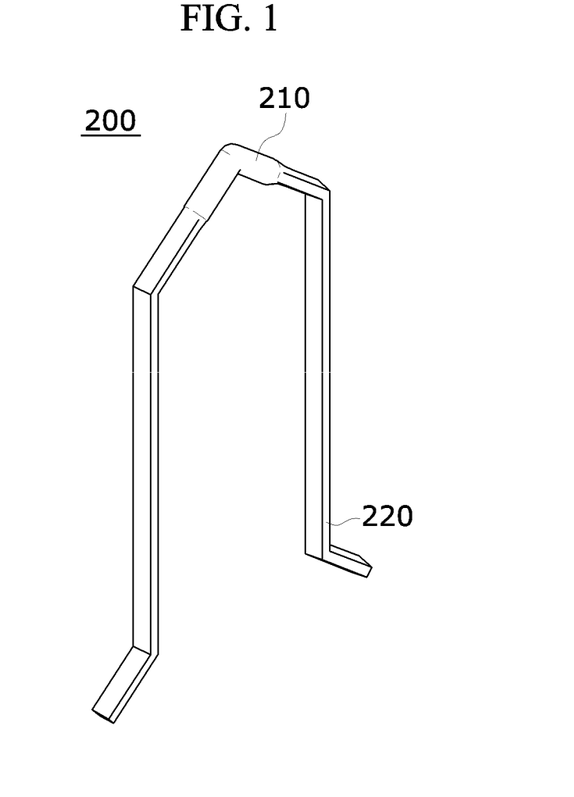
FIG. 1 is a perspective view illustrating a hairpin coil of a stator assembly of a hairpin winding motor according to a first exemplary embodiment of the present invention.
Figure 2:
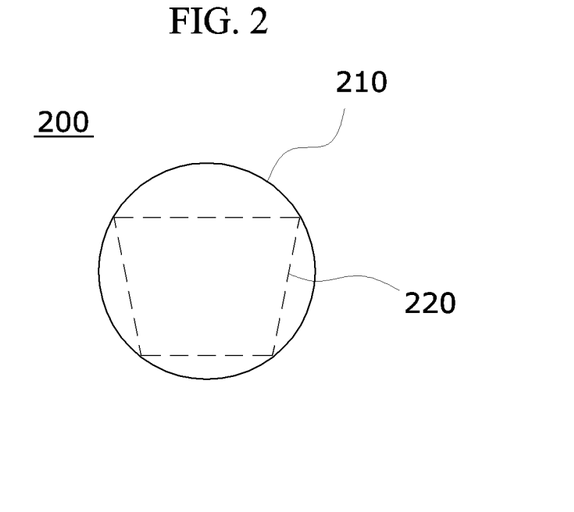
FIG. 2 is a schematic view for comparing cross-sectional areas of a head portion and leg portions of the hairpin coil according to the first exemplary embodiment of the present invention.
Figure 3:
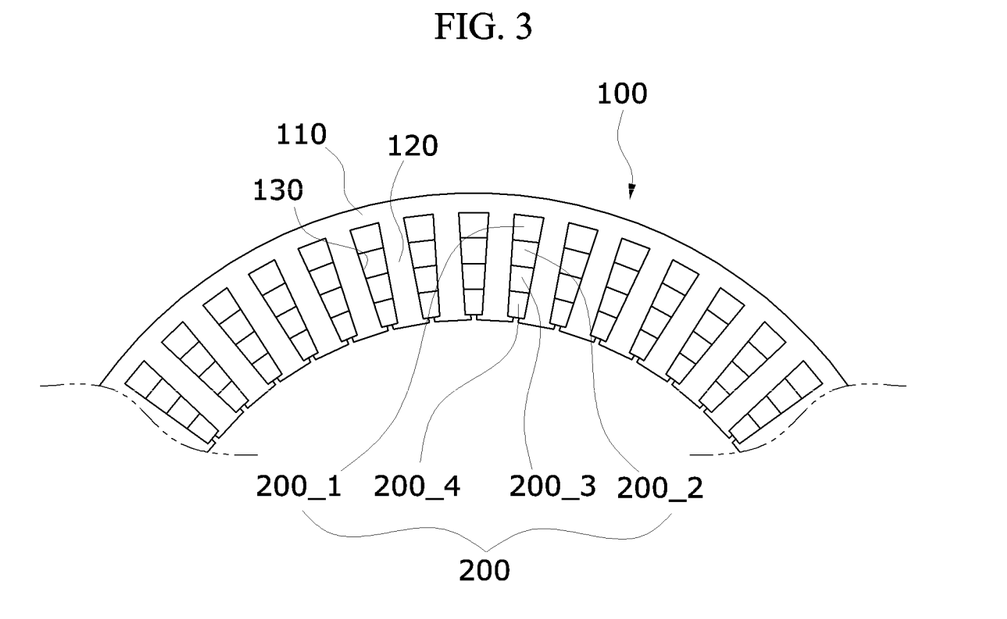
FIG. 3 is a plan view illustrating a flat surface of the stator assembly of the hairpin winding motor according to the first exemplary embodiment of the present invention.
Figure 4A:
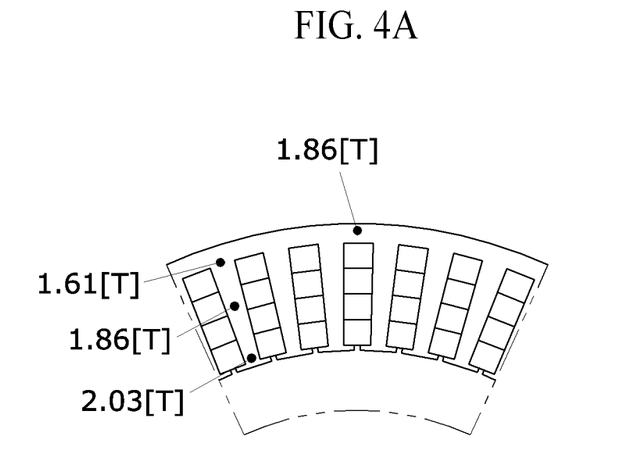
FIGS. 4A and 4B are views respectively illustrating saturation of the stator assembly of the hairpin winding motor according to the related art and the first exemplary embodiment of the present invention.
Figure 4B:
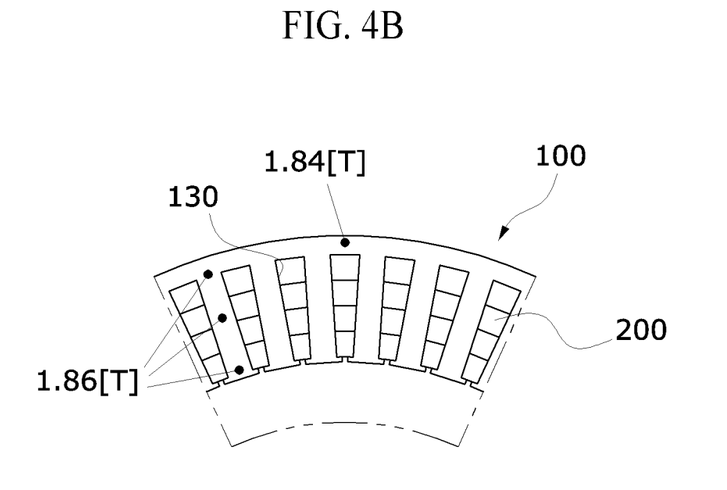

FIG. 1 is a perspective view illustrating a hairpin coil of a stator assembly of a hairpin winding motor according to the first exemplary embodiment of the present invention. FIG. 2 is a schematic view for comparing cross-sectional areas of a head portion and leg portions of the hairpin coil according to the first exemplary embodiment of the present invention. FIG. 3 is a plan view illustrating a flat surface of the stator assembly of the hairpin winding motor according to the first exemplary embodiment of the present invention. FIGS. 4A and 4B are comparative views respectively illustrating saturation of the stator assembly of the hairpin winding motor according to the related art and the first exemplary embodiment of the present invention.

Referring to FIGS. 1 to 4B, the stator assembly of the hairpin winding motor according to the first exemplary embodiment includes a stator core 100 and a hairpin coil 200.

A plurality of slots 130 pass through the stator core 100 in an axial direction along a circumferential direction.

The stator core 100 includes a yoke 110 and teeth 120.

The yoke 110 is formed of a magnetic material, forms a magnetic path, and forms a body of the stator core 100.

Further, the yoke 110 is formed in a closed-loop shape to support the teeth 120.

A plurality of teeth 120 protrude radially inward from an inner circumferential surface of the yoke 110 along a circumferential direction and thus, the slots 130 are each formed between the teeth 120.

The plurality of teeth 120 may be continuously disposed in the circumferential direction of the yoke 110 or radially to form a circular ring shape as a whole.

Meanwhile, since the teeth 120 are formed on the inner circumferential surface of the yoke 110, the slots 130 formed by the teeth 120 are opened in an inward direction and closed in an outward direction by the yoke 110.

Further, the slot 130 is formed to have a trapezoidal shape, in which the outside is broad and the inside is narrow, and a cross-sectional shape of each of the teeth 120 is formed in a rectangular shape.

That is, since the trapezoidally-shaped slots 130 are formed along the circumferential direction of the yoke 110, which is formed to have a circular shape, cross-sectional shapes of the teeth 120 are each formed to be rectangular, and thus, cross-sectional thicknesses of the teeth 120 are formed to be the same.

The hairpin coil 200 is formed in plural to be respectively fastened to and interconnected with the slots 130 to form a coil winding, and a raw coil coated with a coating and having a straight length of a predetermined diameter, is processed through a coil processing machine, thereby having connection portions connected to each other.

Further, a cross-sectional shape of the hairpin coil 200 is formed to be circular.

Accordingly, the hairpin coil 200 of FIG. 4B may have an improved yield and reduced production costs in comparison with a conventional hairpin coil 200 of FIG. 4A in which a cross-sectional shape is formed to be rectangular.

Further, in the hairpin coil 200 of which the cross-sectional shape is formed to be circular, the likelihood of damage to a film incurred during twisting and bending work may be reduced.

The hairpin coil 200 includes a head portion 210 and leg portions 220.

The head portion 210 is bent in a U shape and exposed to the outside of the stator core 100 and serves as a connection portion configured to connect a pair of leg portions 220.

Further, the pair of leg portions 220 extend from both ends of the head portion 210 in parallel and are inserted into the slots 130, and end portions of the leg portions 220 are exposed to the outside of the stator core 100.

Specifically, in one hairpin coil 200, the leg portion 220 in one end direction among the pair of leg portions 220 which extend from both ends of the head portion 210 is inserted into a specific slot 130 of the stator core 100, and the leg portion 220 in the other end direction is inserted into the slot 130 at a position spaced from the specific slot 130 by one pole pitch.

Like the above, the plurality of hairpin coils 200 are respectively inserted into the slots 130 along the circumferential direction.

Further, the two leg portions 220 of the hairpin coil 200 disposed adjacent to each other in the circumferential direction are welded to each other.

Meanwhile, a cross-section of the head portion 210 is formed in a circular shape, and each cross-section of the pair of leg portions 220 is formed to have a trapezoidal shape.

More specifically, the leg portion 220 is formed to have a trapezoidal shape in which the outside is broad and the inside is narrow.

Accordingly, a space between an outer side surface of the leg portion 220 of the hairpin coil 200 and an inner side surface of the slot 130 is removed.

Accordingly, as shown in FIG. 4B, since saturation of the stator core 100 is maintained at a level of 1.84 T to 1.86 T by increasing a space factor between the leg portions 220 and the slot 130, magnetic flux density is nearly uniform, and thus, the output performance of a driving motor may be improved.

Further, preferably, in the hairpin coil 200, only regions of the leg portions 220 may be manufactured through a rolling process using a circular coil.

Accordingly, in the hairpin coil 200, the cross-sectional shape of the head portion 210 may be maintained to be circular, and the cross-sectional shape of each of the leg portions 220 may be easily manufactured to be trapezoidal.

Although the present exemplary embodiment describes that the leg portions 220 are manufactured through a rolling method, the leg portions 220 may be manufactured through various methods in addition to the rolling method as long as the cross-sections of the leg portions 220 may each be manufactured to have a trapezoidal shape, which is the same as the cross-section of the slot 130.

Meanwhile, as shown in FIG. 2, the cross-sectional area of the head portion 210 is greater than the cross-sectional area of each of the leg portions 220.

More specifically, the cross-sectional area of the head portion 210 is formed to be roughly 2 to 20% greater than the cross-sectional area of each of the leg portions 220.

The hairpin coils 200 are formed of a first coil 200_1 to a fourth coil 200_4 according to insertion positions of the leg portion 220 when the pair of leg portions 220 are inserted into the specific slot 130 and the slot 130 spaced apart from the specific slot 130 by one pole pitch.

More specifically, as shown in FIG. 3, the hairpin coils 200 are formed of the first coil 200_1 of which the pair of leg portions 220 are inserted into the slot 130 in a direction toward the yoke 110, the second coil second coil 200_2 of which the pair of leg portions 220 are inserted into the slot 130 opposite the yoke 110 with respect to the first coil 200_1, the third coil 200_3 of which the pair of leg portions 220 are inserted into the slot 130 opposite the yoke 110 with respect to the second coil 200_2, and the fourth coil 200_4 of which the pair of leg portions 220 are inserted into the slot 130 opposite the yoke 110 with respect to the third coil 200_3.

Further, cross-sectional areas of the first coil 200_1 to the fourth coil 200_4 are formed to be the same.

However, the cross-sectional areas of the first coil 200_1 to the fourth coil 200_4 are the same but shapes of the first coil 200_1 to the fourth coil 200_4 become different according to the insertion positions into the slots 130.

Accordingly, since the hairpin coils 200, of which the first coil 200_1 to the fourth coil 200_4 have the same cross-sectional area, are used instead of the hairpin coils 200 of which the first coil 200_1 to the fourth coil 200_4 have different cross-sectional areas, to manufacture the hairpin coils 200 according to the present exemplary embodiment formed of the first coil 200_1 to the fourth coil 200_4, manufacturing costs may be reduced.

Further, an overall cross-sectional shape of each of the leg portions 220 of the first coil 200_1 to the fourth coil 200_4 inserted into the specific slots 130 is formed to be trapezoidal, corresponding to a cross-sectional shape of the specific slot 130, of which the outside is broad and the inside is narrow.

Accordingly, since the overall cross-sectional shape of each of the leg portions 220 of the first coil 200_1 to the fourth coil 200_4 and the cross-sectional shape of the specific slot 130 are the same, the output performance of the driving motor due to resistance reduction may be improved by increasing the space factor between the leg portions 220 and the slot 130.

Hereinafter, a second exemplary embodiment of the present invention will be described in detail with reference to the accompanying drawings.

Figure 5:
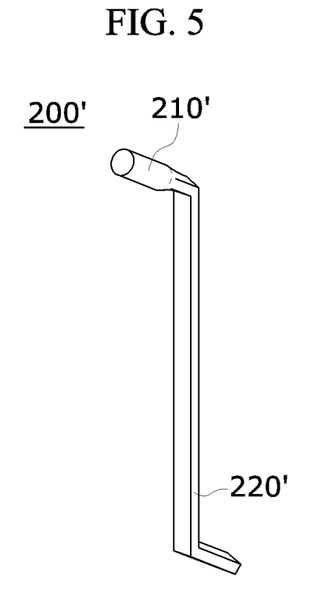
FIG. 5 is a perspective view illustrating a hairpin coil of a stator assembly of a hairpin winding motor according to a second exemplary embodiment of the present invention.
Figure 6:
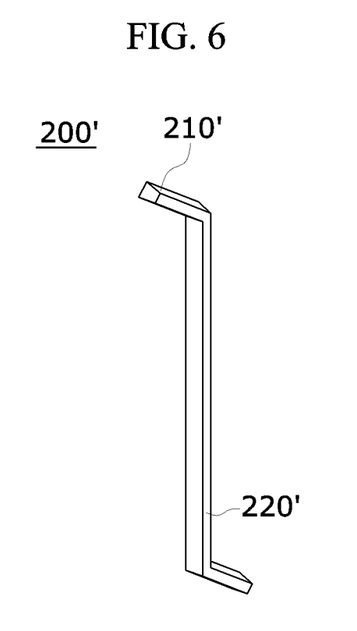
FIG. 6 is a perspective view illustrating a hairpin coil of a stator assembly of a hairpin winding motor according to another exemplary embodiment of the present invention.
Figure 7:
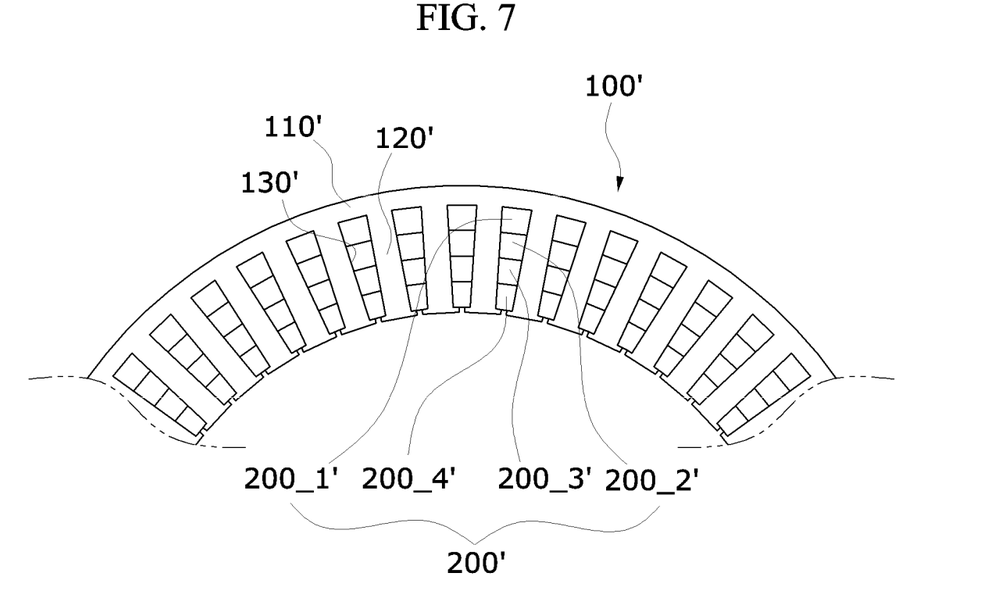
FIG. 7 is a plan view illustrating a flat surface of the stator assembly of the hairpin winding motor according to the second exemplary embodiment of the present invention.

FIG. 5 is a perspective view illustrating a hairpin coil of a stator assembly of a hairpin winding motor according to the second exemplary embodiment of the present invention. FIG. 6 is a perspective view illustrating a hairpin coil of a stator assembly of a hairpin winding motor according to another exemplary embodiment of the present invention. FIG. 7 is a plan view illustrating a flat surface of the stator assembly of the hairpin winding motor according to the second exemplary embodiment of the present invention.

Referring to FIGS. 5 to 7, the stator assembly of the hairpin winding motor according to the second exemplary embodiment includes a stator core 100' and a hairpin coil 200'.

A plurality of slots 130' pass through the stator core 100' in an axial direction along a circumferential direction.

The stator core 100' includes a yoke 110' and teeth 120'.

The yoke 110' is formed of a magnetic material, forms a magnetic path, and forms a body of the stator core 100'.

Further, the yoke 110' is formed in a closed-loop shape to support the teeth 120'.

A plurality of teeth 120' protrude radially inward from an inner circumferential surface of the yoke 110' along a circumferential direction and thus, the slots 130' are each formed between the teeth 120'.

The plurality of teeth 120' may be continuously disposed in the circumferential direction of the yoke 110' or radially to form a circular ring shape as a whole.

Meanwhile, since the teeth 120' are formed on the inner circumferential surface of the yoke 110', the slots 130' formed by the teeth 120' are opened in an inward direction and closed in an outward direction by the yoke 110'.

Further, the slot 130' is formed in a trapezoidal shape of which the outside is broad and the inside is narrow, and a cross-sectional shape of each of the teeth 120' is formed in a rectangular shape.

That is, since the trapezoidally-shaped slots 130' are formed along the circumferential direction of the yoke 110' which is formed to have a circular shape, cross-sectional shapes of the teeth 120' are each formed to have a rectangular shape, and thus, cross-sectional thicknesses of the teeth 120 become the same.

Accordingly, since saturation of the stator core 100' is maintained at a level of about 1.84 T to 1.86 T, magnetic flux density is uniform, and thus, the output performance of a driving motor may be improved.

A plurality of the hairpin coils 200' are formed to be respectively fastened to and interconnected with the slots 130' to form a coil winding, and a raw coil coated with a coating and having a straight length of a predetermined diameter is processed through a coil processing machine.

Further, a cross-sectional shape of the hairpin coil 200' is formed to be circular.

Accordingly, the hairpin coil 200' may have an improved yield and reduced production costs in comparison with a conventional hairpin coil 200' of which a cross-sectional shape is formed to be rectangular.

Further, in the hairpin coil 200' of which the cross-sectional shape is formed to have the circular shape, damage to a film during bending may be reduced.

The hairpin coil 200' includes a head portion 210' and a leg portion 220'.

The head portion 210' is formed at one end of the hairpin coil 200', and is exposed to the outside of the stator core 100', the leg portion 220' is formed at the other end of the hairpin coil 200', and is exposed to the outside of the stator core 100' after extending from the other end of the head portion 210' and being inserted into the slot 130'.

Meanwhile, the hairpin coils 200' formed in plural are repeatedly inserted into a specific slot 130' and the slot 130' spaced one pole pitch from the specific slot 130' along a circumferential direction.

Further, two head portions 210' disposed adjacent to each other in a circumferential direction are welded to each other, and two leg portions 220' disposed adjacent to each other in a circumferential direction are welded to each other.

Meanwhile, a cross-section of the head portion 210' is formed to have a circular shape, and a cross-section of the leg portion 220' is formed to have a trapezoidal shape.

More specifically, the leg portion 220' is formed to have a trapezoidal shape, of which the outside is broad and the inside is narrow.

Accordingly, since a space between an outer side surface of the leg portion 220' of the hairpin coil 200' and an inner side surface of the slot 130' is removed, the output performance of a driving motor due to resistance reduction may be improved by increasing a space factor between the leg portion 220' and the slot 130'.

Further, preferably, in the hairpin coil 200', only a region of the leg portion 220' may be manufactured through a rolling process using a circular coil.

Accordingly, in the hairpin coil 200', the cross-sectional shape of the head portion 210' may be circular, and the leg portion 220' may be easily manufactured to have a trapezoidal cross-sectional shape.

Although the present exemplary embodiment describes that the leg portion 220' is manufactured through a rolling method, the leg portion 220' may be manufactured through various methods in addition to the rolling method as long as the cross-section of the leg portion 220' may be manufactured to have a trapezoidal shape the same as the cross-section of the slot 130'.

Meanwhile, the cross-sectional area of the head portion 210' is greater than the cross-sectional area of the leg portion 220'.

More specifically, the cross-sectional area of the head portion 210' is formed to be roughly 2 to 20% greater than the cross-sectional area of the leg portion 220'.

Accordingly, when the hairpin coil 200' is inserted into the slot 130', since the head portion 210' is engaged with an upper surface of the tooth 120', a length in which the hairpin coil 200' is inserted into the slot 130' may be a uniform length, and thus, a height of an end coil may be uniformly managed.

Meanwhile, although a case in which the circular-shaped head portion 210' is formed at one end of the hairpin coil 200' and the trapezoidal-shaped leg portion 220' is formed at the other end of the hairpin coil 200' is described in the second exemplary embodiment, in another exemplary embodiment, as shown in FIG. 6, the cross-sectional shape of the head portion 210' may be formed to be trapezoidal, similar to the leg portion 220'.

In this case, the cross-sectional areas of the head portion 210' and the leg portion 220', each formed to have the trapezoidal shape, are formed to be the same.

Further, the head portion 210' and the leg portion 220' each formed to have the trapezoidal shape may be simultaneously manufactured through a rolling process.

The hairpin coils 200' are formed of a first coil 200_1' to a fourth coil 200_4' according to insertion positions of the leg portion 220' when the leg portion 220' is inserted into the specific slot 130.

More specifically, as shown in FIG. 7, the hairpin coils 200' are formed of the first coil 200_1' of which the leg portion 220' is inserted into the slot 130' in a direction toward the yoke 110', the second coil second coil 200_2' of which the leg portion 220' is inserted into the slot 130' opposite the yoke 110' with respect to the first coil 200_1', the third coil 200_3' of which the leg portion 220' is inserted into the slot 130' opposite the yoke 110' with respect to the second coil 200_2', and the fourth coil 200_4' of which the leg portion 220' is inserted into the slot 130' opposite the yoke 110' with respect to the third coil 200_3'.

Further, cross-sectional areas of the first coil 200_1' to the fourth coil 200_4' are formed to be the same.

However, although the cross-sectional areas of the first coil 200_1' to the fourth coil 200_4' are the same, the shapes of the first coil 200_1' to the fourth coil 200_4' become different according to the insertion positions into the slots 130'.

Accordingly, since the hairpin coils 200' of which the first coil 200_1' to the fourth coil 200_4' have the same cross-sectional area are used instead of the hairpin coils 200' of which the first coil 200_1' to the fourth coil 200_4' have the different cross-sectional areas to manufacture the hairpin coils 200' according to the present invention formed of the first coil 200_1' to the fourth coil 200_4', manufacturing costs may be reduced.

Further, an overall cross-sectional shape of the leg portion 220' of the first coil 200_1' to the fourth coil 200_4' inserted into the specific slots 130' is formed to have a trapezoidal shape, corresponding to a cross-sectional shape of the specific slot 130', of which the outside is broad and the inside is narrow.

Accordingly, since the overall cross-sectional shape of the leg portion 220 of the first coil 200_1' to the fourth coil 200_4' and the cross-sectional shape of the specific slot 130' are the same, the output performance of the driving motor due to resistance reduction may be improved by increasing the space factor between the leg portion 220' and the slot 130'.

As described above, in the stator assembly of the hairpin winding motor according to the present invention, since the cross-sectional shape of the hairpin coil 200 or 200' is formed to be circular, a yield may be improved, production costs may be reduced, and damage to the film during the twisting or bending work may be reduced.

Further, since the leg portion 220 or 220' is formed to have the trapezoidal shape of which the outside is broad and the inside is narrow, the magnetic flux density of the stator core 100 or 100' is uniform, and thus, the output performance of the driving motor may be improved by increasing the space factor between the leg portion 220 or 220' and the slot 130 or 130'.

In addition, in the hairpin coil 200 or 200', since only the region of the leg portion 220 or 220' is manufactured through the rolling process using the circular coil, the cross-sectional shape of the head portion 210 or 210' may be maintained to be circular, and the cross-sectional shape of the leg portion 220 or 220' may be easily manufactured to have the trapezoidal shape.

In addition, since the overall cross-sectional shape of the leg portion 220 or 220' of the first coil 200_1 or 200_1' to the fourth coil 200_4 or 200_4' and the cross-sectional shape of the specific slot 130 or 130' are the same, the output performance of the driving motor due to resistance reduction may be improved by increasing the space factor between the leg portion 220 or 220' and the slot 130 or 130'.

In addition, since the cross-sectional area of the head portion 210' is formed to be roughly 2 to 20% greater than the cross-sectional area of the leg portion 220', when the hairpin coil 200' is inserted into the slot 130', the head portion 210' is engaged with an upper surface of the tooth 120' and thus, the length in which the hairpin coil 200' is inserted into the slot 130' may be a uniform length, thereby uniformly managing the height of the end coil.

In a stator assembly of a hairpin winding motor according to the present invention, since a cross-sectional shape of a hairpin coil is formed to be circular, a yield can be improved, production costs can be reduced, and damage to a film during twisting or bending can be reduced.

Further, since a leg portion is formed to have a trapezoidal shape, of which the outside is broad and the inside is narrow, magnetic flux density of a stator core is uniform by increasing a space factor between the leg portion and a slot, and accordingly, the output performance of a driving motor can be improved.

Further, since only a region of the leg portion of the hairpin coil is manufactured through a rolling process using a circular coil, a cross-sectional shape of a head portion can be maintained to be circular, and the leg portion can be easily manufactured to have a cross-sectional shape in a trapezoid shape.

In addition, since an overall cross-sectional area of each of the leg portions of a first coil to a fourth coil and a cross-sectional area of the slot are the same, there is an effect of improving the output of the driving motor due to resistance reduction by increasing the space factor between the leg portion and the slot.

In addition, since the cross-sectional area of the head portion is formed to be roughly 2 to 20% greater than the cross-sectional area of the leg portion, when the hairpin coil is inserted into the slot, the head portion is engaged with an upper surface of the tooth and thus, a length in which the hairpin coil is inserted into the slot can be a uniform length, and accordingly, a height of an end coil can be uniformly managed.

The present invention is not limited to the above-described embodiments and may be variously modified within the scope of the technical spirit of the present invention.

What is claimed is:

1. A stator assembly of a hairpin winding motor, comprising:
   a stator core including a plurality of slots passing therethrough in a circumferential direction; and
   a plurality of hairpin coils respectively fastened to and interconnected with the slots to form a coil winding,
   wherein:
   each of the hairpin coils includes a head portion bent in a U shape and exposed to the outside of the stator core; and a pair of leg portions configured to extend in parallel from both ends of the head portion to be inserted into a specific slot and the slot spaced apart from the specific slot by one pole pitch, and of which end portions are exposed to the outside of the stator core;
   each of the slots has a trapezoidal shape, of which the outside is broad and the inside is narrow; and
   each of the pair of leg portions has a trapezoidal cross-sectional shape, of which the outside is broad and the inside is narrow.

2. The stator assembly of claim 1, wherein:
   the stator core includes a yoke formed of a magnetic material and forming a magnetic path, and a plurality of teeth protruding radially inward from an inner circumferential surface of the yoke along a circumferential direction to form the slot; and
   each of the teeth is formed to have a rectangular cross-sectional shape.

3. The stator assembly of claim 1, wherein the two leg portions of the hairpin coil disposed adjacent to each other in a circumferential direction are welded to each other.

4. The stator assembly of claim 1, wherein:
the head portion is formed to have a circular cross-sectional shape; and
each of the pair of leg portions is formed to have a trapezoidal cross-sectional shape, of which the outside is broad and the inside is narrow.

5. The stator assembly of claim 4, wherein a cross-sectional area of the head portion is roughly 2 to 20% greater than cross-sectional areas of the leg portions.

6. The stator assembly of claim 4, wherein the leg portions are formed through a rolling process.

7. The stator assembly of claim 4, wherein the hairpin coils are formed of a first coil inserted into the slot in a direction toward the yoke, a second coil inserted into the slot opposite the yoke with respect to the first coil, a third coil inserted into the slot opposite the yoke with respect to the second coil, and a fourth coil inserted into the slot opposite the yoke with respect to the third coil.

8. The stator assembly of claim 7, wherein cross-sectional areas of the leg portion of the first coil, the leg portion of the second coil, the leg portion of the third coil, and the leg portion of the fourth coil are the same.

9. A stator assembly of a hairpin winding motor, comprising:
a stator core including a plurality of slots passing therethrough in a circumferential direction; and
a plurality of hairpin coils respectively fastened to and interconnected with the slots to form a coil winding,
wherein:
each of the hairpin coils includes a head portion exposed to the outside of the stator core at one end thereof, and a leg portion configured to extend from the other end of the head portion to be inserted into the slot and of which an end portion is exposed to the outside of the stator core;
each of the slots has a trapezoidal shape, of which the outside is broad and the inside is narrow; and
each of the pair of leg portions has a trapezoidal cross-sectional shape, of which the outside is broad and the inside is narrow.

10. The stator assembly of claim 9, wherein:
the stator core includes a yoke formed of a magnetic material and forming a magnetic path, and a plurality of teeth protruding radially inward from an inner circumferential surface of the yoke along a circumferential direction to form the slot; and
each of the teeth is formed to have a rectangular cross-sectional shape.

11. The stator assembly of claim 9, wherein, in the plurality of the hairpin coils, two head portions, which are repeatedly inserted into a specific slot and the slot spaced apart from the specific slot by one pole pitch along a circumferential direction, and disposed adjacent to each other in a circumferential direction, are welded to each other, and two leg portions disposed adjacent to each other in a circumferential direction are welded to each other.

12. The stator assembly of claim 9, wherein:
a cross-section of the head portion is formed to have a circular shape; and
a cross-section of the leg portion is formed to have a trapezoidal shape, of which the outside is broad and the inside is narrow.

13. The stator assembly of claim 12, wherein a cross-sectional area of the head portion is roughly 2 to 20% greater than a cross-sectional area of the leg portion.

14. The stator assembly of claim 12, wherein the leg portions are formed through a rolling process.

15. The stator assembly of claim 12, wherein the hairpin coils are formed of a first coil inserted into the slot in a direction toward the yoke, a second coil inserted into the slot opposite the yoke with respect to the first coil, a third coil inserted into the slot opposite the yoke with respect to the second coil, and a fourth coil inserted into the slot opposite the yoke with respect to the third coil.

16. The stator assembly of claim 15, wherein cross-sectional areas of the leg portion of the first coil, the leg portion of the second coil, the leg portion of the third coil, and the leg portion of the fourth coil are the same.

17. The stator assembly of claim 9, wherein each of a cross-section of the head portion and a cross-section of the leg portion is formed to have a trapezoidal shape, of which the outside is broad and the inside is narrow.

18. The stator assembly of claim 17, wherein cross-sectional areas of the head portion and the leg portion are the same.

19. The stator assembly of claim 18, wherein the head portion and the leg portion are formed through a rolling process.

* * * * *